United States Patent [19]

Tanaka et al.

[11] Patent Number: 4,577,362

[45] Date of Patent: Mar. 25, 1986

[54] APPARATUS FOR REMOVING FOREIGN MATTER FROM FLEXIBLE SUPPORT

[75] Inventors: Yasunori Tanaka; Shinji Noda, both of Kanagawa, Japan

[73] Assignee: Fuji Photo Film Co., Ltd., Kanagawa, Japan

[21] Appl. No.: 581,019

[22] Filed: Feb. 17, 1984

[30] Foreign Application Priority Data

Feb. 18, 1983 [JP] Japan .................. 58-24846

[51] Int. Cl.[4] ............................. B08B 1/02
[52] U.S. Cl. ..................... 15/256.5; 15/308; 118/123
[58] Field of Search ............ 15/308, 256.5, 256.6; 118/123

[56] References Cited

U.S. PATENT DOCUMENTS

| 399,544 | 3/1889 | Manahan | 118/123 |
| 2,243,844 | 6/1941 | Gift | 118/123 |
| 2,529,699 | 11/1950 | Lach | 118/123 |
| 4,331,993 | 5/1982 | Pfost et al. | 15/256.5 X |
| 4,455,706 | 6/1984 | Volkmann et al. | 15/308 X |

Primary Examiner—Chris K. Moore
Attorney, Agent, or Firm—Sughrue, Mion, Zinn, Macpeak and Seas

[57] ABSTRACT

An apparatus for removing foreign matter from a flexible support such as a photographic film or magnetic tape. After applying a solvent to the surface of the support from which the foreign matter is to be removed, the support is passed over at least two parallel adjacent plates which extend widthwise perpendicular to the direction of movement of the support, with the plates being located relative to the support at a position before the solvent evaporates. The edge surface of the downstream one of the two plates is provided with a cutting edge at the upstream side thereof. The cutting edge forms a gap with the surface sufficiently small that the foreign matter to be removed cannot enter the gap. Further, the gap is large enough to leave solvent film in a thickness of at least 0.2 microns after passing the two plates.

9 Claims, 5 Drawing Figures

APPARATUS FOR REMOVING FOREIGN MATTER FROM FLEXIBLE SUPPORT

BACKGROUND OF THE INVENTION

The present invention relates to an apparatus for removing foreign matter from the surface of a flexible support.

The term "support" as used herein is intended to mean a flexible belt-shaped support made of plastic film several centimeters to several meters in width, more than several tens of meters in length, and several microns to several hundred of microns in thickness. Examples of the material of the belt include polyethylene terephthalate, polyethylene-2.6-naphthalate, cellulose diacetate, cellulose triacetate, cellulose acetate propionate, polyvinyl chloride, polyvinylidene chloride, polycarbonate, polyimide, and polyamide; pieces of paper on which is deposited a layer formed of α-polyolefins having two ten carbons such as polyethylene, polypropylene and ethylene-butane copolymer; metal foils of aluminum, copper, and tin; and belt-shaped supports which are prepared by preliminarily treating the surfaces of the above-described various belt-shaped supports.

The support is coated with one or more solutions such as a photosensitive solution, magnetic solution, surface protecting solution, charge preventing solution and smoothing solution according to the application. The support thus coated is dried and cut to desired dimensions to provide a desired product. Typical products are various photographic films, pieces of photographic paper and rolls of magnetic tape.

The following methods of removing foreign matter from the surface of such a support are well known in the art. In a first method, a piece of unwoven cloth or a blade is abutted against the support in a suitable manner to remove foreign matter from the support. In a second method, clean air is blown across the belt-shaped support at high speed to remove the foreign matter from the support, and the foreign matter thus removed is directed to a suction hole provided near the support. These methods are of a "dry" type. In contrast to these dry type methods, "wet" type methods are also known in the art. In one of the wet type methods, a belt-shaped support is conveyed into a cleaning solution tank where foreign matter is removed from the support by ultrasonic vibration. In another method, after a cleaning solution is applied to the support, air is blown across the support at high speed (see Japanese Patent Application Publication No. 13020/1974).

These methods all involve particular problems. For instance, the method of removing foreign matter with a piece of cloth or a blade suffers from a difficulty that the support can be scratched by the cloth or blade, or is electrostatically charged by friction. In the case where unwoven cloth is used to remove the foreign matter, fibers of the unwoven cloth may fall onto the surface of the support and stick to the support.

The method of removing foreign matter by applying air at high speed is effective in removing foreign matter of relatively large size, more than about 20 or 30 microns; however it is not effective in removing foreign matter of relatively small size or foreign matter adhering strongly to the support. The wet-type foreign matter removing method described above is disadvantageous in that an apparatus for practicing the method is considerably large in size. Moreover, when foreign matter is removed from a support which is running at high speed, a large quantity of mist is generated which tends to stick not only to the surrounding equipment, but also to the support from which the foreign matter has been removed.

Accordingly, an object of the invention is to provide an apparatus for removing foreign matter from the surface of a support in which the above-mentioned difficulties accompanying a conventional method have been eliminated.

SUMMARY OF THE INVENTION

The foregoing object and other objects of the invention have been achieved by the provision of an apparatus for removing foreign matter from a flexible support in which, after a necessary amount of solvent is applied to a flexible support to the surface of which foreign matter to be removed adheres, the surface is passed over at least two plates arranged in the direction of movement of the support and positioned relative to the support before the solvent evaporates, the two plates being defined by the following conditions:

(1) the two plates are adjacent to each other and parallel to each other, and extend along the widthwise direction of the support, (2) each of the two plates has a surface which confronts the support, the surface being longer than the width of the support in the widthwise direction of the support and shorter in the direction or movement.

(3) at least the surface of the plate provided on the downstream side in the direction of movement of the support, which confronts the support, is sharply cut by an adjacent surface thereof to have a cutting edge at the upstream end thereof, (4) at least the surface of the plate provided on the upstream side in the direction of movement of the support and the support have a gap therebetween, the gap being sufficiently small at the upstream end thereof that the foreign matter to be removed cannot enter the gap, and (5) the gap is large enough to leave a solvent film of a thickness of at least 0.2 microns on the support which has passed through the plates.

The earlier-described conventional method in which the blade is used is the more effective of the conventional techniques in removing foreign matter from a support. However, the method is not practical because in a dry state the support is liable to be scratched, as described above, and foreign matter removed may stick to the edge of the blade due to static electricity. On the other hand, in the method of the invention, after a solvent film is formed on the support, the foreign matter is removed together with the solvent film. Accordingly, in the method of the invnetion, there is little likelihood that the support will be scratched due to the lubricating action of the solvent film, and very little static electricity is induced in the support for the same reason. Since the foreign matter is scraped together wtih the solvent film as described above, the foreign matter scraped off with the blade will not stick to the edge of blade. That is, such matter is dispersed in the solvent film, leaving the edge of the blade as the solvent film falls away from the blade. In order to remove the conditions (1) through (5) are essential.

DESCRIPTION OF THE PREFERRED EMBODIMENTS

Figure 1:
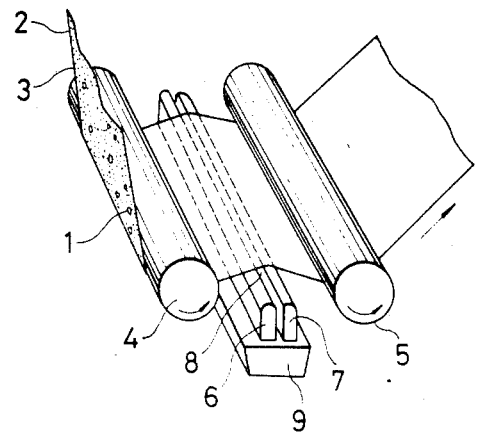
FIG. 1 is an explanatory diagram showing the overall arrangement of an apparatus for practicing a method of removing foreign matter from a flexible support according to the invention.

The invention will now be described in detail with reference to FIGS. 1 through 3. FIG. 1 shows the overall arrangement of an apparatus of the invention. As shown in FIG. 1, a flexible support 2 to which foreign matter 1 has adhered is moved along rollers 4 and 5 by a support conveying device after a solvent film 3 has been coated thereon. A plate 6 provided on the upstream side and a plate 7 provided on the downstream side are positioned between the rollers 4 and 5 in such a manner that they are parallel to each other and extend across the support. The plates 6 and 7 meet the support 2 at a position before the solvent film 3 evaporates so as to remove a part or almost all of the solvent film 3. In this operation, the foreign matter 1 adhering to the support is also removed therefrom together with the solvent film 3, dispersed in dropping solvent passes through slot 8, and finally discharged out of the system through a solvent receiving pan 9.

Figure 2:
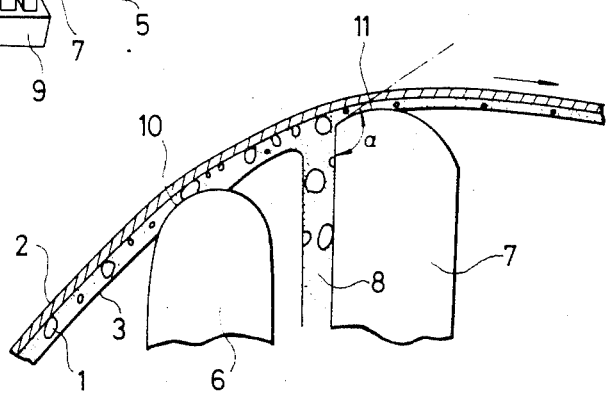
FIG. 2 is a sectional side view showing in detail essential components of the apparatus of FIG. 1.

FIG. 2 shows the plates in more detail. The upstream plate 6 and the downstream plate 7 are arranged adjacent to each other as described above. Of these plates, only the downstream plate 7 is absolutely necessary to remove foreign matter from the support. However, addition of the upstream plate 6 immediately before the downstream plate 7 provides an advantage in that the gap between the support 2 and the upper edge 11 of the plate 7 which confronts the support 2 is made uniform in the widthwise direction. In the case where the solvent film 3 is removed using the downstream plate 7 alone, it is difficult to reduce longitudinal crease-shaped irregularities between the roller 4 and the plate 7. This is especially difficult in the case of a very thin support such as photographic film or magnetic tape. If the gap is not uniform because of the presence of longitudinal crease-shaped iregularities, it is impossible to uniformly remove the foreign matter from the support, and the gap between the plate and the support may become small locally, as a result of which the support can be scratched.

On the other hand, using two plates as in the case of the invention, the support will have no longitudinal crease-shaped irregularities between the two plates. That is, the support is made flat between the two plates. Accordingly, the gap at the upstream edge of the downstream plate is uniform in the widthwise direction.

In order to make the gap uniform, it is desirable that the distance between the upstream plate 6 and the downstream plate 7 be 20 mm or less. However, it is essential that the distance be long enough to allow the dropping solvent, which has been scraped by the upstream edge of the downstream plate 7, to smoothly flow down the downstream plate. It is preferable that this distance be determined experimentally because there are many factors such as layout and preliminary scraping which must be taken into account.

The upstream plate 6 and the downstream plate 7 have surfaces 10 and 11, respectively, each of which is longer than the width of the support in the widthwise direction of the support and shorter in the direction of running. Each of the surfaces 10 and 11 may be a flat surface or a curved surface, or it may be made up of flat surfaces, or a flat surface and a curved surface. In order for the support 2 to run stably and the foreign matter to be removed over the width of the support, it is essential that the length of the plates 6 and 7 be longer than the width of the support 2.

If the plates are made longer in the direction of running, that is, if the surfaces 10 and 11 are increased in width, an increase in friction results. Accordingly, the widths of the surfaces 10 and 11 should be as small as possible. However, the surfaces should not be too short because, if the plates have knife edges, where the plates meet the support, the surface pressures will be excessively high. The length of the edge should be 0.5 to 20 mm, preferably 1 to 15 mm. In FIG. 2, the surface 11 of the downstream plate 7, which confronts the support 2, is cut sharply by the adjacent surface so that the upstream end thereof is similar to a cutting edge. In order to finally remove substantially all of the foreign matter, it is essential that the gap between the support 2 and the upstream edge of the downstream plate 7 be uniform, as described above, so that the foreign matter cannot enter the gap between the plate 7 and the support. In order to effectively satisfy these requirements, the surface 11 of the plate 7 which confronts the support should be sharply cut by the adjacent surface, thereby making the upstream end of the surface similar to a cutting edge. Accordingly, the foreign matter 1, after striking the adjacent surface, drops together with the dropping solvent through slot 8.

In order to improve this effect, it is preferable that the angle α which is formed between the surface 11 of the downstream plate 7 and the adjacent surface, on the upstream side, of the plate 7 be 120 degrees or less. If the angle is larger than 120 degrees, then the foreign matter is liable to enter the gap. For the same reason, the gap between the support and the upstream edge of the plate surface 11 is made smaller. Since the foreign matter is blocked by the upstream edge, the allowable gap depends on the size of foreign matter to be removed. However, if the gap is made excessively small, then the support 2 will be scratched. In order to eliminate this difficulty, it is necesary to leave a solvent film at least 0.2 microns in thickness on the support 2 afer passing the downstream plate 7 and to maintain the gap large enough to form the solvent film.

Figure 3:
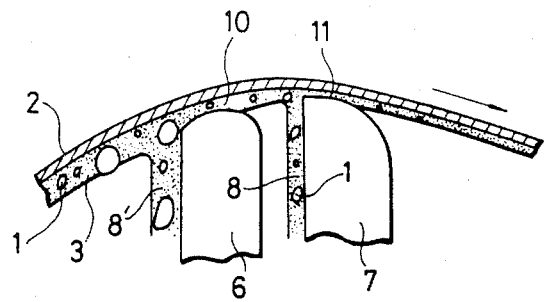
FIG. 3 is a sectional side view showing in detail a modification of the essential components of the apparatus of the invention.

FIG. 3 shows one preferred embodiment of the invention. The upstream end of the surface 10 of the upstream plate 6, which confronts the support 2, is also formed into a sharp cutting edge. The support 2 is run substantially in the direction of a tangent to the surface 10. In this operation, the foreign matter 1 together with the solvent film 3 is scraped off by the upstream plate 6 and the downstream plate 7. As illustrated in FIG. 3 a slot 8' is formed upstream of plate 6. Relatively large foreign matter is blocked by the upstream edge of plate 6 and passes into the slot 8' for discharge. Relatively smaller matter 1 passes over plate 6 and is scraped off by plate 7 for discharge through slot 8. Surface 10 of plate 6 has a radius of curvature $R_1$ and angle $\alpha$ (see FIG. 4) between the vertical face and the tangential line with support 2. Accordingly, the embodiment of FIG. 3 is capable of more completely removing foreign matter than that of FIG. 2. The embodiment in FIG. 3 is effective especially in removing large foreign matter which may cause serious problems.

It is desirable that the surfaces 10 and 11 of the plates 6 and 7 which confront the support 2 have little roughness and that they be as straight as possible in the widthwise direction of the support 2. In order to improve the durability of the plates 6 and 7, it is preferable that the end portions of the plates 6 and 7 be made of metal or ceramic, preferably cemented carbide or hard ceramic.

Fundamentally, any solvent which forms a liquid film stably on the support can be employed in the process of the invention and it is not necessary for the solvent to dissolve the foreign matter. However, it goes without saying that the solvent should not adversely affect the surface of the support. Whether or not the scraped solvent is recycled or whether a step of thermal evaporation is employed after the above-described operation should be suitable determined in accordance with the application at hand.

The above-described method of the invention has eliminated the difficulties accompanying the conventional method and can be used to very effectively remove foreign matter from a support without adversely affecting the quality of the surface of the support.

EXAMPLE

Figure 4:
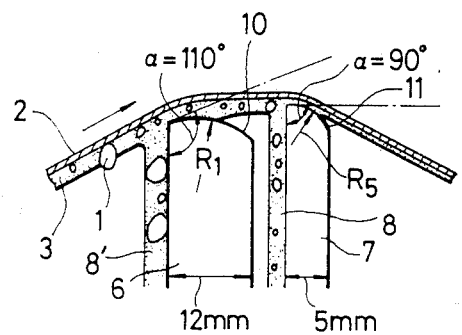
FIG. 4 is a sectional view showing approximate dimensions of the essential components of an apparatus for practicing the method of the invention provided as a specific example.
Figure 5:
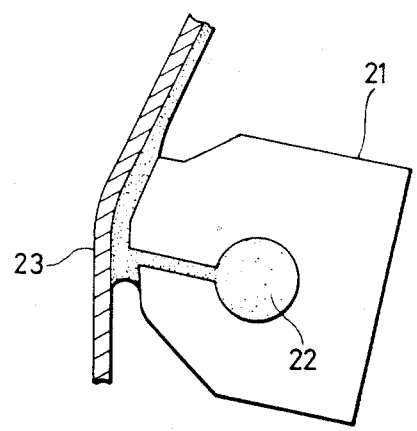
FIG. 5 is an explanatory diagram showing a magnetic layer forming device employed in the specific example.

The invention will now be further described with reference to a specific example. The plates used were as depicted in FIG. 4. As indicated in FIG. 4, the surface 10 of the upstream plate 6 had a radius of curvature $R_1 = 10$ mm and an edge angle $\alpha = 110$ degrees at the upstream end, and the surface 11 of the downstream plate 7 had a radius of curvature $R_2 = 5$ mm and an edge angle $\alpha = 90$ degreees at the upstream end. The support was arranged so as to be run substantially tangent to the plate surfaces. Other conditions were as follows:

Support:
material—Polyethylene terephthalate
thickness—20 microns
width—500 mm
Solvent: xylole The above-described foreign matter removing device was employed in a magnetic tape coating process. The support was run at a speed of 30 m/min. After being coated with xylole by a roll coater, the support passed through the foreign matter removing device, and then the solvent was completely removed by a hot air type solvent evaporating unit 5 m in length. Thereafter, a coating device 21 as shown in FIG. 5 was used to apply a magnetic solution 22 to the support 23 in thicknesses of 10, 20 and 30 microns in accordance with a method disclosed in Japanese Laid-Open Patent Application No. 84771/1982, after which the coating were checked for coating defects. The term "coating defects" as herein used includes pin-hole-shaped or stripe-shaped coating defects where no coating is formed, and coating defects in which the coating thickness is not more than 50% of the desired value. When stripe-shaped coating defects occured successively over about a hundred meters of the support, the operation of coating the support with the magnetic solution was stopped once. Thereafter, the coating operation was carried out again, and the coating was checked for coating defects. The coating defects were detected by a defect detecting device before the coated support was wound, and the frequency of occurrence of pin-hole-shaped coating defects and the frequency of occurrence of stripe-shaped coating defects were determined.

As a comparison example, under the same conditions as those in the above-described example, a magnetic layer was formed on a support by a coating from which no foreign matter was removed. The frequency of occurrence of coating defects of the product was checked in the same manner. The coating magnetic solution used in the above-described experiments was prepared by thoroughly mixing components as indicated in Table 1 below in a ball mill, and the resultant mixture was added to epoxy resin (epoxy equivalent 500) or 30 parts by weight and uniformly mixed and dispersed to again the coating mgnetic solution.

TABLE 1

| | |
|---|---|
| $\gamma$-Fe$_2$O$_3$ powder (needle-shaped particles having an average major diameter 0.5 microns and a coercive force of 320 Oe) | 300 parts by weight |
| Vinyl chloride - vinyl acetate copolymer (copolymerization ratio 87:13, polymerization degree 400) | 30 parts by weight |
| Electrically conductive carbon | 20 parts by weight |
| Polyamide resin (amine value 300) | 15 parts by weight |
| Lecithin | 6 parts by weight |
| Silicon oil (dimethyl polysiloxane) | 3 parts by weight |
| Xylole | 300 parts by weight |
| Methly isobutyl ketone | 300 parts by weight |
| n-butanol | 100 parts by weight |

The balanced viscosity of the coating magnetic solution thus prepared was measured with a Shimazu rheometer model no. RM-1 manufactured by Shimazu Seisakusho Company of Japan and found to be 8 poise with a shear rate of 10 sec$^{-1}$, and 1 poise with a shear rate of 500 sec$^1$.

For each of the above-described three different thicknesses of magnetic film formed on the support, ten rolls, each 4000 m long, were tested for coating defects. The results of test are indicated in the following Table 2. Each entry in Table 2 represents the average frequency of occurrence of coating defects per roll.

TABLE 2

| | | Liquid-phase magnetic Layer thickness | | |
|---|---|---|---|---|
| | | 10 microns | 20 microns | 30 microns |
| Foreign matter removed | Stripes | 0 | 0 | 0 |
| | Pin holes | 0.6 | 0 | 0 |
| Foreign matter not removed | Stripes | 4.8 | 1.9 | 0.4 |
| | Pin holes | 35.3 | 14.6 | 2.2 |

We claim:

1. An apparatus for removing foreign matter from a flexible support, comprising: a supply of a solvent solution for application on said flexible support, means for applying said solvent to a flexible support to the surface of which foreign matter to be removed adheres; means for moving said support over said plates; means for tensioning said support; foreign matter and solvent removing means located downstream in the direction of movement from the applying means wherein said foreign matter and solvent are removed before the solvent evaporates, said removing means further comprising; at least two parallel adjacent plates extending widthwise perpendicular to the direction of movement of said support, each of said two plates having an edge surface which confronts said support, said surface being longer than the width of said support in the widthwise direction of said support and shorter in the direction of movement than said width of said support, at least said surface of one of said plates on the downstream side in the direction of movement of said support being sharply cut by an adjacent surface thereof to provide a cutting edge at the upstream end thereof, at least said surface of said plate provided on the downstream side in the direction of movement of said support and said support forming a gap therebetween of a size determined by the operation of said means for moving said support and said tensioning means, said gap being sufficiently small at an upstream end that said foreign matter to be removed cannot enter said gap, said gap being large enough to leave a solvent film at least 0.2 microns thick on said support after passing said plates.

2. The apparatus of claim 1, wherein said two plates are spaced apart by a distance of no more than 20 mm.

3. The apparatus of claim 1, wherein the length of said edge surfaces is in a range of 0.5 to 20 mm.

4. The apparatus of claim 1, wherein the length of said edge surfaces is in a range of 1 to 15 mm.

5. The apparatus of claim 1, wherein said surface of said one of said plates on the downstream side forms an angle with said adjacent surface of no more than 120 degrees.

6. The apparatus of claim 1, wherein end portions fo said plates including said edge surfaces are formed of a material selected from the group consisting of metals and ceramics.

7. The apparatus of claim 1, wherein end portions of said plates including said end surfaces are made of a material selected from the group consisting of cemented carbide and hard ceramic.

8. The apparatus of claim 1 further comprising a first slot formed upstream of an upstream one of said adjacent plates to remove and discharge foreign matter of a first size.

9. The apparatus of claim 8 further comprising a second slot formed upstream of a downstream one of said adjacent plates to remove and discharge foreign matter of a second size, smaller than said first size of foreign matter.

* * * * *